United States Patent

Davis et al.

Patent Number: 5,605,412
Date of Patent: Feb. 25, 1997

[54] DOOR HOLDING CONNECTOR PLATE

[76] Inventors: Dave D. Davis, P.O. Box 414, Flora Vista, N.M. 87415; Christopher P. Edwards, 6100 McKensey St., Farmington, N.M. 87401

[21] Appl. No.: 369,462

[22] Filed: Jan. 6, 1995

[51] Int. Cl.$^6$ .................................................... F16B 15/00
[52] U.S. Cl. ..................... 403/403; 403/401; 403/292; 411/467; 411/461
[58] Field of Search ...................... 411/467, 466, 411/468, 465, 464, 463, 462, 461; 403/403, 401, 382, 293, 292, 294

[56] References Cited

U.S. PATENT DOCUMENTS

| | | | |
|---|---|---|---|
| 493,882 | 3/1893 | White | 411/467 X |
| 1,402,304 | 1/1922 | Lord | 403/401 X |
| 2,039,125 | 4/1936 | Stuart | 403/403 X |
| 2,413,362 | 12/1946 | Maxwell | 403/403 |
| 4,730,971 | 3/1988 | Lin | 411/466 X |

*Primary Examiner*—Anthony Knight

[57] ABSTRACT

A plate for coupling a plurality of doors together for painting. The inventive device includes a first planar member coupled to a second planar member and oriented so as to extend substantially orthogonally from the first planar member. A plurality of piercing teeth extend from the planar member to engage the upper edges of a plurality of doors, joining the doors in a spaced and orthogonal orientation for painting the doors.

9 Claims, 3 Drawing Sheets

DOOR HOLDING CONNECTOR PLATE

BACKGROUND OF THE INVENTION

1. Field of the Invention

The present invention relates to connecting structures and more particularly pertains to a door holding connector plate for coupling a plurality of doors together for painting.

2. Description of the Prior Art

The use of connecting structures is known in the prior art. More specifically, connecting structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art connecting structures include U.S. Pat. No. 4,235,148; U.S. Pat. No. 4,486,115; U.S. Pat. No. 4,165,672; and U.S. Pat. No. 3,841,194.

While these devices fulfill their respective, particular objectives and requirements, the aforementioned patents do not disclose a door holding connector plate for coupling a plurality of doors together which includes a first planar member coupled to a second planar member and oriented so as to extend substantially orthogonally therefrom, and a plurality of piercing teeth extending from the planar members to engage the upper edges of a plurality of doors, whereby the doors are joined in a spaced and orthogonal orientation for painting thereof.

In these respects, the door holding connector plate according to the present invention substantially departs from the conventional concepts and designs of the prior art, and in so doing provides an apparatus primarily developed for the purpose of coupling a plurality of doors together for painting thereof.

SUMMARY OF THE INVENTION

In view of the foregoing disadvantages inherent in the known types of connecting structures now present in the prior art, the present invention provides a new door holding connector plate construction wherein the same can be utilized for coupling a plurality of doors together in a substantially spaced and orthogonal orientation. As such, the general purpose of the present invention, which will be described subsequently in greater detail, is to provide a new door holding connector plate apparatus and method which has many of the advantages of the connecting structures mentioned heretofore and many novel features that result in a door holding connector plate which is not anticipated, rendered obvious, suggested, or even implied by any of the prior art connecting structures, either alone or in any combination thereof.

To attain this, the present invention generally comprises a plate for coupling a plurality of doors together for painting. The inventive device includes a first planar member coupled to a second planar member and oriented so as to extend substantially orthogonally therefrom. A plurality of piercing teeth extend from the planar member to engage the upper edges of a plurality of doors, whereby the doors are joined in a spaced and orthogonal orientation for painting thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new door holding connector plate apparatus and method which has many of the advantages of the connecting structures mentioned heretofore and many novel features that result in a door holding connector plate which is not anticipated, rendered obvious, suggested, or even implied by any of the prior art connecting structures, either alone or in any combination thereof.

It is another object of the present invention to provide a new door holding connector plate which may be easily and efficiently manufactured and marketed.

It is a further object of the present invention to provide a new door holding connector plate which is of a durable and reliable construction.

An even further object of the present invention is to provide a new door holding connector plate which is susceptible of a low cost of manufacture with regard to both materials and labor, and which accordingly is then susceptible of low prices of sale to the consuming public, thereby making such door holding connector plates economically available to the buying public.

Still yet another object of the present invention is to provide a new door holding connector plate which provides in the apparatuses and methods of the prior art some of the advantages thereof, while simultaneously overcoming some of the disadvantages normally associated therewith.

Still another object of the present invention is to provide a new door holding connector plate for coupling a plurality of doors together in a substantially spaced and orthogonal orientation for painting thereof.

Yet another object of the present invention is to provide a new door holding connector plate which includes a first planar member coupled to a second planar member and oriented so as to extend substantially orthogonally therefrom, and a plurality of piercing teeth extending from the planar members to engage the upper edges of a plurality of doors, whereby the doors are joined in a spaced and orthogonal orientation for painting thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
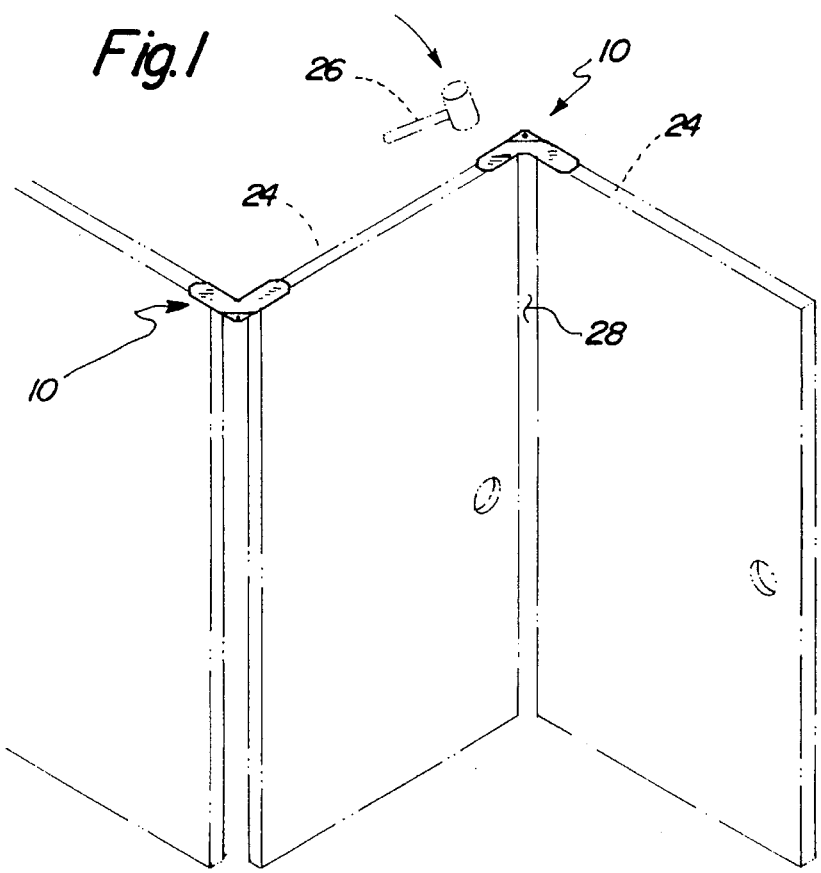
FIG. 1 is an isometric illustration of a plurality of door holding connector plates according to the present invention in use.

With reference now to the drawings, and in particular to FIGS. 1–6 thereof, a new door holding connector plate embodying the principles and concepts of the present invention and generally designated by the reference numeral 10 will be described.

Figure 3:
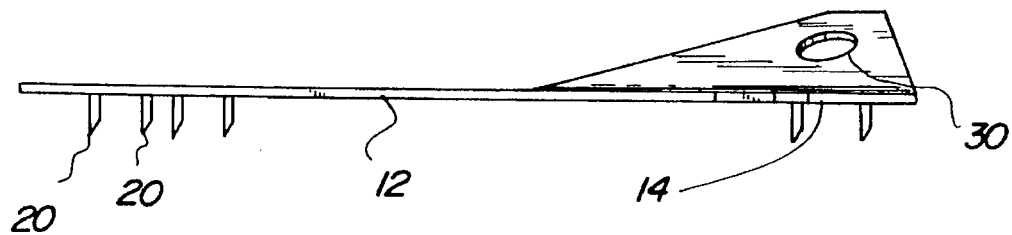
FIG. 3 is a side elevation view of the door holding connector plate, per se.
Figure 4:
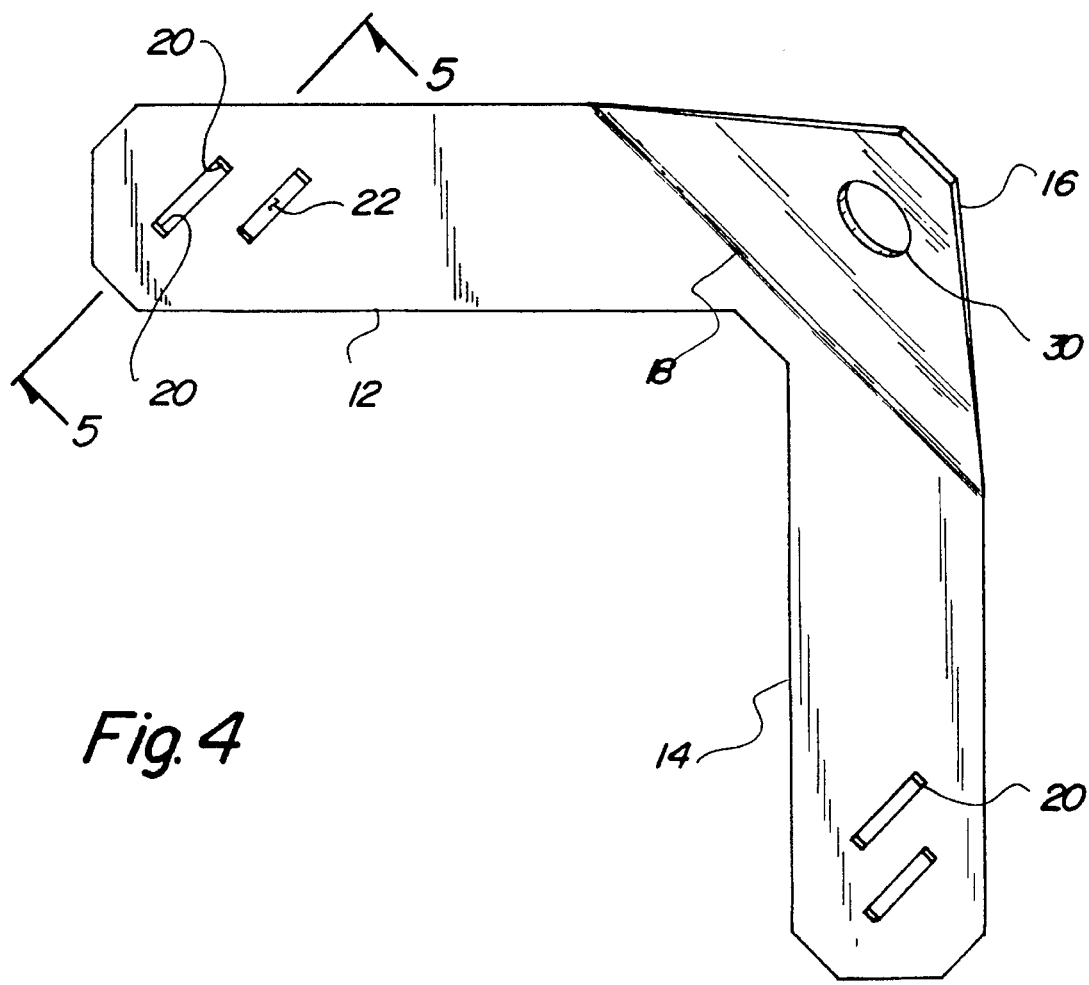
FIG. 4 is a top plan view thereof.

More specifically, it will be noted that the door holding connector plate 10 comprises a first planar member 12 having opposed longitudinal sides oriented in a substantially spaced and parallel orientation so as to define a substantially rectangular shape of the first planar member. A second planar member 14 is integrally or otherwise fixedly secured to the first planar member 12 and similarly includes a pair of spaced and parallel longitudinal sides which cooperate to define the substantially rectangular shape of the second planar member. The first planar member 12 is joined to the second planar member 14 by an integral corner plate 16, as best illustrated in FIGS. 3 and 4. Preferably, the first planar member 12 and the second planar member 14 reside within a common plane, with the integral corner plate 16 projecting out of the common plane at an oblique angle relative thereto. To this end, the integral corner plate 16 is bent slightly upwards along a fold line 18 extending diagonally between and oriented at an oblique angle relative to outer longitudinal sides of the planar members 12, 14. Because the integral corner plate 16 projects out of the common plane of the planar members 12, 14, significant strength and rigidity is imparted to the device 10 along the fold line 18 for purposes which will subsequently be described in more detail.

Figure 5:
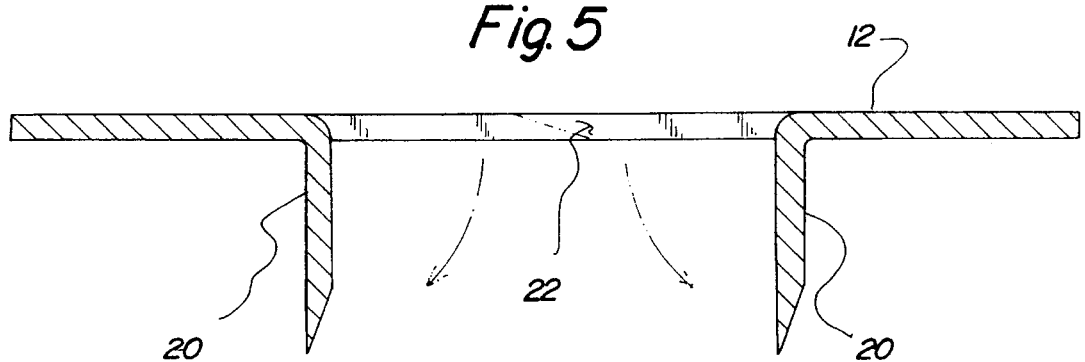
FIG. 5 is a cross-sectional view taken along line 5—5 of FIG. 4.

As shown in FIGS. 3 through 5, each of the planar members 12 is provided With a plurality of piercing teeth 20 projecting downwardly therefrom. To this end, each of the piercing teeth 20 is integrally formed into the planar members 12, 14 by a pair of unlabelled, spaced and parallel slots directed through the planar members 12, 14, with an unlabelled diagonal slot connecting the spaced and parallel slots together so as to define the sharpened tip of each of the piercing teeth 20. After a creation of the slots, the piercing teeth are biased out of the common plane of the planar members 12, 14 in pairs to define the downwardly projecting piercing teeth illustrated in the figures. Subsequent to a biasing of the piercing teeth 20 from the common plane of the planar members 12, 14, an observing aperture 22 is created between the spaced and parallel slots which permits an individual to ascertain a distance which the piercing teeth 20 are projected into a workpiece.

Figure 2:
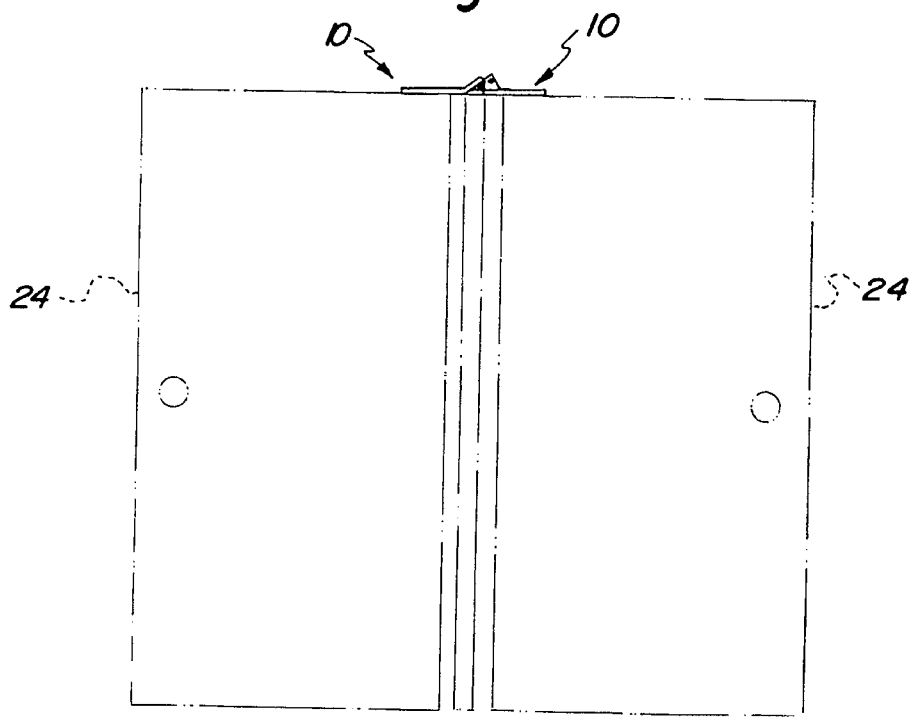
FIG. 2 is a front elevation view of a plurality of the plates in use.

The present invention 10 can be utilized to join a plurality of doors 24 together in a substantially spaced and orthogonal orientation, as illustrated in FIGS. 1 and 2 of the drawings. To this end, the connector plate 10 can be engaged to upper edges of the doors 24 through an impacting of the planar members 12, 14 by a hammer 26 or other impacting device which drives the piercing teeth 20 into the upper edges of the doors. A space 28 is intentionally left between the doors 24 such that spray painting or the like of the doors 24 can be accomplished to coat all vertically extending surfaces of the doors. After painting or coating of the doors 24, the hammer 26 can be utilized to impact a bottom surface of the juncture between the first planar member 12 and the second planar member 14 along the fold line 18 to effect removal of the device 10 from the doors 24. Alternatively, the palm of a human hand can be engaged to the device 10 beneath the fold line, with digits of the hand extending over the integral corner plate 16, whereby an upward pressure exerted on the device will effect removal thereof from the associated doors. Thus, the fold line 18 serves not only to position the integral corner plate 16 out of the common plane of the planar member 12, 14 but also reinforces the device 10 such that it can receive a blow from the hammer 26 or a force from an individual's hand without suffering from plastic deformation.

Figure 6:
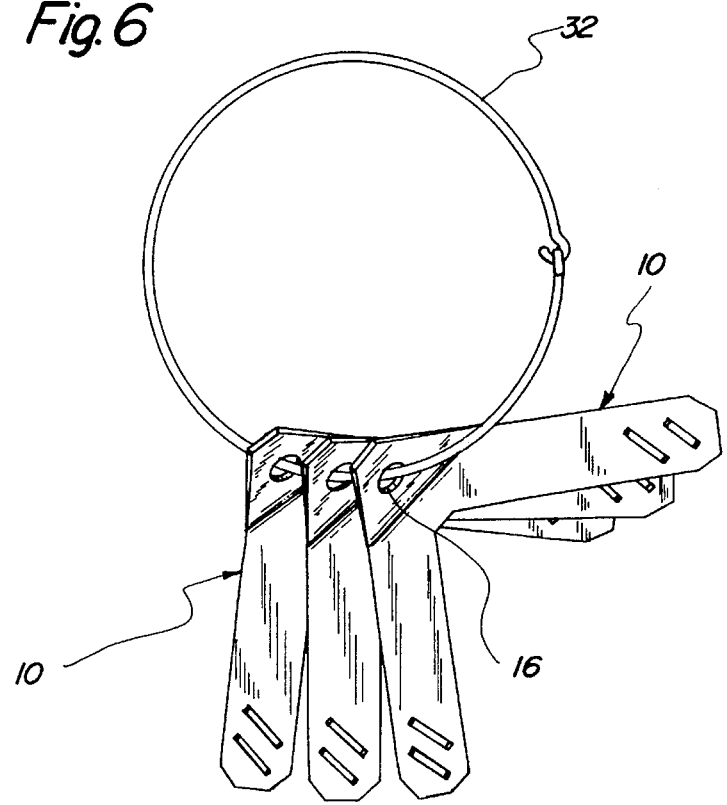
FIG. 6 is an elevation view of a plurality of door holding connector plates coupled together by a securing ring.

The integral corner plate 16 may additionally be provided with a mounting aperture 30 directed therethrough which permits an unillustrated tether to be coupled to the device 10 during use thereof for anchoring to an adjacent supporting structure. For example, should the device 10 be utilized outdoors in windy conditions, a tether coupled to the mounting aperture 30 of the integral corner plate 16 and to an adjacent supporting structure can serve to preclude unintentional tipping or falling of the doors 24 as a result of such wind currents. Further, the present invention 10 may additionally include a securing ring 32 extending through the mounting aperture 30 of the integral corner plate 16 such that a plurality of the connector plates 10 can be coupled together as shown in FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A door holding connector plate comprising:

a first planar member;

a second planar member residing within a common plane with the first planar member;

an integral corner plate fixedly secured to the first planar member and the second planar member to fixedly secure the first planar member to the second planar member such that the first planar member is oriented so as to extend substantially orthogonally for the second planar member and projecting out of the common plane at an oblique angle relative the common plan; and a plurality of piercing teeth projecting downwardly from the planar members for piercing engagement with a workpiece to secure the planar members the workpiece.

2. The door holding connector plate of claim 1, wherein the integral corner plate is bent upwards along a fold line extending diagonally between and oriented at an oblique angle relative to outer longitudinal sides of the planar members, wherein the fold line imparts strength and rigidity to the connector plate.

3. The door holding connector plate of claim 2, wherein the first planar member is shaped so as to define opposed longitudinal sides oriented in a substantially spaced and parallel orientation so as to define a substantially rectangular shape of the first planar member, and further wherein the second planar member is shaped so as to define a pair of spaced and parallel longitudinal sides which cooperate to define a substantially rectangular shape of the second planar member.

4. The door holding connector plate of claim 3, wherein each of the piercing teeth is integrally formed into the planar members by a pair of spaced and parallel slots directed through the respective planar member with an diagonal slot connecting the spaced and parallel slots together so as to define a sharpened tip of each of the piercing teeth, with the piercing teeth being biased out of the common plane of the planar members in pairs to define the downwardly projecting piercing teeth.

5. The door holding connector plate of claim 4, wherein the integral corner plate includes a mounting aperture directed therethrough.

6. The door holding connector plate of claim 5, and further comprising a securing ring extending through the mounting aperture of the integral corner plate such that a plurality of the connector plates can be coupled together.

7. A method of securing two doors together for painting, said method comprising the steps of:

providing a connector plate including a first planar member, a second planar member residing within a common plane with the first planar member, an integral corner plate fixedly secured to the first planar member and the second planar member to fixedly secure the first planar member to the second planar member such that the first planar member is oriented so as to extend substantially orthogonally for the second planar member and projecting out of the common plane at an oblique angle relative the common plan, and a plurality of piercing teeth projecting downwardly from the planar members for piercing engagement with a workpiece to secure the planar members the workpiece;

positioning two doors adjacent to one another in a spaced and orthogonal orientation;

positioning the first planar member of the connector plate on top of a first one of the doors;

positioning the second planar member of the connector plate on top of a second one of the doors;

impacting the first planar member to drive the piercing teeth thereof into the first door; and impacting the second planar member to drive the piercing teeth thereof into the second door.

8. A method of securing two doors together for painting of claim 7, said method further comprising the steps of:

coupling a tether to the connector plate and two an adjacent support structure.

9. A method of securing two doors together for painting of claim 7, said method further comprising the steps of:

painting vertical surfaces of the doors.

\* \* \* \* \*